Patented Nov. 14, 1939

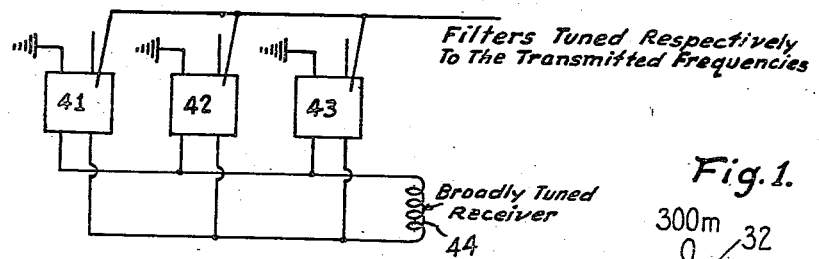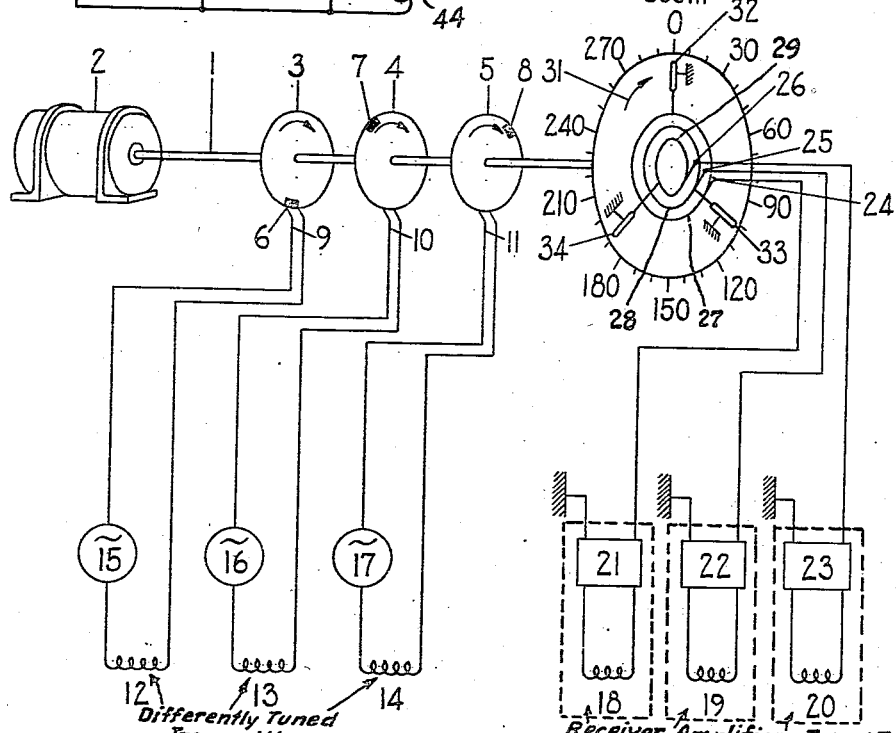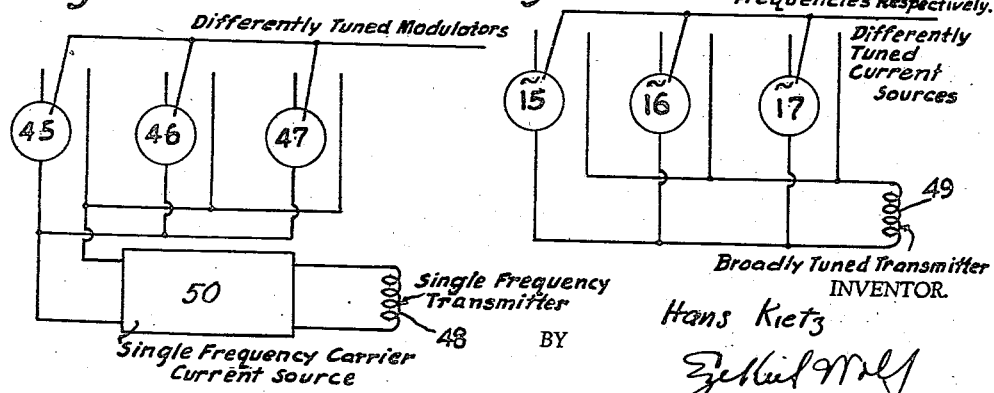

2,179,509

UNITED STATES PATENT OFFICE 2,179,509

DEPTH MEASURING APPARATUS

Hans Kietz, Bremen, Germany, assignor to Atlas Werke Aktiengesellschaft, Bremen, Germany Application June 15, 1936, Serial No. 85,241
In Germany August 16, 1935

3 Claims. (Cl. 177—386)

The present invention relates to a method and apparatus for measuring distances and more in particular depths of water beneath a vessel.

In systems of this type it is common practice to employ a sound transmitter and a sound receiver and to measure the time interval necessary for the sound to travel to the reflecting surface and be reflected back again to the receiver. In arrangements of these types the transmission of the sound is synchronized with a rotating indicator and a scale such that an emission of the sound signal takes place at the zero point on the scale. The scale is calibrated in depth in such a way that when the returning echo operates the receiving system, indication as read on the scale produces the measurement of the depth. In apparatus of this type it is customary to produce the sound emissions at intervals sufficiently far enough apart so that one signal is received before the next signal is transmitted. This is for the most part necessary since if a signal were emitted before the signal reflected was received, the receiver may be agitated from the sound arriving directly from the transmitter and thereby interfere with the reflected echo as it is being picked up. Since the depth or distance is assumed to be an unknown quantity, it is, of course, evident that the receiver should be fully responsive and capable to operate the indicator by the reflected signal at any time in the complete revolution of the indicator. This makes it necessary to space the transmitted signals at such time intervals that a depth at least equivalent to the range of the scale will go by before the next signal is given.

If, therefore, a scale is made reading up to 300 fathoms, the shortest time interval at which signals may be sent is equivalent to 600 fathoms or approximately two-thirds of a second. While this is not objectionable as a rule for shallow depths, for deeper depths as, for instance, 1000 or more fathoms, time interval becomes proportionately greater and therefore makes it quite impossible to obtain rapid soundings.

Another type of depth sounder employing the time of travel method has been used in which the interval between successive signals is varied until a coincidence is obtained between the direct and reflected signal. In this case it will be appreciated that one signal may be sent out before the preceding signal is returned and because of this factor two readings must be taken for coincidence at different frequency of signals in order to establish the depth without any ambiguity. This is not only a comparatively slow process because it necessitates two measurements to determine a depth, but it is also slow because the comparison needs more than a single signal to be certain that the coincidence is established.

The system according to the present invention is more particularly concerned with obtaining a greater number of depth indications on an indicating device than previously has been possible and in this respect employs separate transmitters and separate receivers which operate independent indicating devices mounted on a common indicating disc. Each transmitter is preferably operated at a different frequency from each other and for each transmitter only one receiver is adapted to respond so that one transmitter corresponds to its receiver and the receiver responds only to that transmitter.

The invention is illustrated more particularly by the drawing attached to the specification in which the arrangement is shown more or less schematically. Fig. 1 shows a complete system according to the invention; Fig. 2 shows a modification of the receiver portion of the circuit; Fig. 3 shows a modification of the transmitter portion of the circuit; and Fig. 4 shows a further modification of the transmitter portion of the circuit.

In accordance with the drawing a common driving system is employed as indicated by the shaft 1 operated by the motor 2. On the shaft 1 there may be mounted a plurality of contact discs 3, 4 and 5 on which are positioned conductive segments 6, 7 and 8 adapted to complete the circuit across the brushes 9, 10 and 11. The brush 9 closes the current through the generator 15 and the transmitter 12 while the brush 10 performs a similar function for the generator 16 and the transmitter 13 and the brush 11 for the generator 17 and the transmitter 14. On the receiving end the receivers 18, 19 and 20, respectively, are connected through the amplifiers 21, 22 and 23 to the indicators 32, 33 and 34 positioned in this case at a spacing of 120 degrees upon the disc 30. The amplifiers 21, 22 and 23 may be individually tuned respectively to the frequencies generated by the generators 15, 16 and 17, respectively, to be passed through and affect the indicators 32, 33 and 34. It is possible in this respect to use a single broadly tuned receiver 44 with a plurality of individual filters 41, 42, 43 so that while all of the frequencies are picked up by the receiver, they will be divided and separated so that each filter will pass only one frequency corresponding to the particular transmitter that may be operated as shown in Fig. 2. Likewise, it is possible to use a single transmitter 48 having a broad range of tuning and operated at three different frequencies as shown in Fig. 3. In carrying out this idea it is also possible to use an oscillator 49 having a constant carrier frequency from source 50, particularly where high frequencies are used, and have three separate sources of modulations 45, 46, 47 corresponding to the generators 15, 16 and 17 as shown in Fig. 4.

As shown in Fig. 1, the current is conducted to the receivers through the brushes 24, 25 and 26, respectively, which contact with the slip rings 27, 28 and 29. Adjacent the disc 30 is a scale which may be calibrated in meters or in any other unit. It will be noted that the segments 6, 7 and 8 are positioned to make contacts respectively to operate the transmitters 12, 13 and 14 when the indicators 32, 33 and 34, respectively, come to the zero position. As indicated in Fig. 1, transmitter 12 operates in conjunction with the indicator 32. Transmitter 14 operates in conjunction with the indicator 34 and transmitter 13 in conjunction with the indicator 33. In this way there are three transmissions for each revolution of the disc and since each transmitter and its corresponding receiver are tuned as a group to different frequencies, each transmitter will operate only its corresponding receiver and therefore the transmitted signal will not affect the other receivers. As each indicator, therefore, comes to its zero position, its corresponding transmitter will operate and at some time later in the revolution of the disc depending upon the depth, the echo will operate the indicator. In the meantime, or later, the second indicator will approach zero and a similar operation will occur which will produce an indication at the same spot on the scale providing the depth has not changed. In this way three indications may be produced for a single rotation of the disc.

Having now described my invention, I claim:

1. A system for measuring distance by the time of travel method including a plurality of differently tuned transmitters adapted to transmit wave energy in the same medium, a plurality of receivers responsive respectively each to only one transmitter, an indicating device responsive to said receivers adapted to indicate the distance, means associating said indicating device with said receivers and means for transmitting at separated intervals successive signals from the separate transmitters.

2. A system for measuring distance by the time of travel method comprising a plurality of transmitters, each tuned to different frequencies, a plurality of receivers responsive each to only one transmitter, a scale having a zero position, a plurality of separate indicators rotatable with respect to said scale and successively attaining said zero position, said indicators each being connected with and responsive to a different one of said receivers and means for causing said transmitters successively to transmit signals when its corresponding indicator is at said zero position.

3. A system for measuring distance comprising a plurality of differently tuned transmitters, a plurality of receivers responsive respectively each to only one transmitter and a plurality of indicators, each connected with and responsive to a definite one of said receivers, means mounting said indicators in a spaced relation to each other on a single rotating element and commutator means rotating synchronously with said rotating element for causing said transmitters successively to produce signals at the instant when its corresponding indicator attains a predetermined position which is the same for all indicators.

4. In a system for measuring distance, means for transmitting signals of different characteristics, receiving means having elements individually responsive each only to one of said characteristic signals, indicator means connected with and responsive to said receiving means and including a continuously rotating element, and means for actuating said transmitter means in synchronism with predetermined positions of said rotating element to transmit successively signals of said different characteristics.

5. A system for measuring distance comprising three transmitters, means for operating each of said transmitters at different frequencies, a group of three receivers, each receiver adapted to respond only to one transmitter, a rotating element, a group of three indicator elements for producing an indication of the signals received by the respective receivers, said indicator elements being mounted to rotate with the center of said rotating element and being positioned at equal angular intervals about said center and means for controlling the time of operation of said transmitters including three contact elements also mounted to rotate with said center and positioned at the same angular intervals respectively as the said indicator elements.

6. In a system for measuring distance by the time of travel method means for producing at successive periods vibrations of different and established characteristics, means operative for receiving selectively said vibrations of different characteristics on separate receiving systems, means for individually indicating said signals and means associated with said indicating means for controlling the periods of operation of said transmitting means.

7. In a system for measuring distance by the measurement of the time interval between the time of transmission of a signal and the time of receipt of the signal reflected from the object whose distance is being measured, a plurality of separate complete signal transmitting, receiving and indicating systems and means for associating and controlling the operations of all said systems to produce chronologically successive but spatially coincident indications for any given distance being measured.

8. In a system for measuring distances by the time of travel method and for indicating the distance at time intervals less than the time of travel of an impulse from a transmitting device to a receiving device, including a plurality of differently tuned transmitters of compressional waves at one point, a plurality of compression wave receivers at a second point, means whereby each receiver is tuned to the frequency emitted by only one transmitter, means for periodically transmitting from the individual transmitters in succession at intervals such that the time interval between the transmission from two successively operating transmitters is less than the time of transmission over the greatest interval to be measured and the time interval between successive transmissions from the same transmitter is greater than the time interval corresponding to the greatest distance to be measured, indicating means connected to each of the receiving means, said indicating means including means for giving a complete indication of distance in response to the reception by each individual receiver of waves from its corresponding transmitter.

HANS KIETZ.